(No Model.)

E. R. DINGLEY.
AUTOMATIC CYLINDER DRAINER.

No. 308,757. Patented Dec. 2, 1884.

WITNESSES:

Jacob Fromme
Henry Fromme

Ephraim R Dingley
INVENTOR

BY Henry Arden
his ATTORNEY

UNITED STATES PATENT OFFICE.

EPHRAIM R. DINGLEY, OF NEW YORK, N. Y., ASSIGNOR OF ONE-HALF TO JAMES A. CROUTHERS.

AUTOMATIC CYLINDER-DRAINER.

SPECIFICATION forming part of Letters Patent No. 308,757, dated December 2, 1884.

Application filed January 23, 1884. (No model.)

*To all whom it may concern:*

Be it known that I, EPHRAIM R. DINGLEY, a citizen of the United States, and a resident of the city of New York, in the county of New York and State of New York, have invented certain new and useful Improvements in Automatic Cylinder-Drainers, of which the following is a specification.

The object sought to be accomplished by my invention is to remove the water from the cylinders of steam-engines, which I accomplish in the following manner: I attach to the bottom of the ends of steam-engine cylinders a trap which is so constructed that when its interior mechanism is subjected to a certain prearranged temperature it is closed, and when said temperature is lowered to a less degree it is opened.

Figure 1:
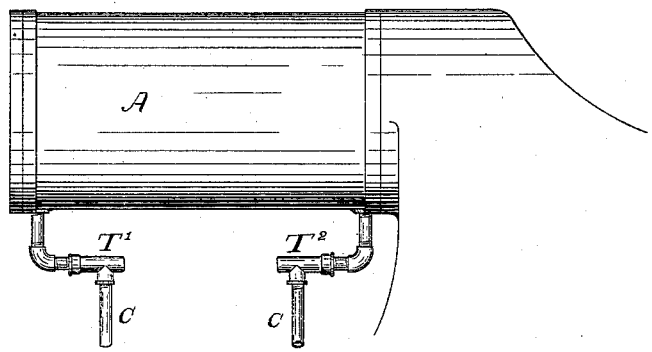
Figure 2:
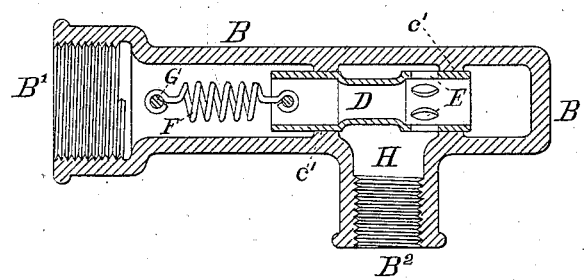

Figure 1 of the drawings is a side elevation of an engine-cylinder with my attachment thereto. Fig. 2 is a longitudinal section through the trap.

In the drawings in Fig. 1, A represents the cylinder of a steam-engine. $T'$ $T^2$ are traps of the kind mentioned above, attached to the bottom of the ends of A, one to each end. C C are discharge-pipes leading from these traps to the sewer or other convenient place.

In Fig. 2 I have represented the preferred form of the traps to be employed, wherein B is the frame of the trap, connected with the cylinder at end B' and with the discharge-pipe at end $B^2$. C' C' is a valve-seat, preferably a balance-valve. D is the valve having ports E E. F is a spiral spring attached to this valve, and G is a stop, to which one end of F is attached, the other end being fastened to the valve D. At the temperature of the water of condensation, D is in a position that the ports E E are open into the discharge-pipe H, but at a temperature greater than that of the water of condensation (previously determined on) the spring F expanding, pushes D in its seat, so that E E are closed by C'.

The operation is as follows: When the steam condenses in the cylinder, the water thereby formed contracts the spring F, so that the ports E E are opened, and through them the water is discharged into H. So soon as the water is discharged the higher temperature of the steam expands the spring F and the ports E E are closed until more condensed water again causes F to open them.

It is obvious that instead of using two traps one only can be used, in which case the two ends of the bottom of the cylinder are connected therewith and a cut-off valve used.

Having thus described my invention, what I claim is—

1. In a steam-engine, the combination, with its cylinder, of a trap having a valve-seat, a sliding perforated valve, and a spring connected to said valve and adapted to be expanded by the steam-heat and contracted by the water of condensation to move the valve to alternately open and close the openings, substantially as described.

2. The trap composed of the casing formed with valve-seats $c'$, in combination with the hollow sliding valve perforated on its side near its end, and a spring adapted by expansion and contraction to move the valve in opposite directions to open and close the same, substantially as described.

Signed at the city of New York, in the county of New York and State of New York, this 5th day of December, A. D. 1883.

EPHRAIM R. DINGLEY.

Witnesses:
 HENRY ARDEN,
 HENRY FROMME.